United States Patent [19]

Blackburn

[11] Patent Number: 4,696,269
[45] Date of Patent: Sep. 29, 1987

[54] DEVICE FOR IMPROVING THE IGNITION OF FUEL-AIR MIXTURES IN INTERNAL COMBUSTION ENGINES

[75] Inventor: Donald Blackburn, Roane County, Tenn.

[73] Assignee: Oak Ridge Systems, Inc., Oak Ridge, Tenn.

[21] Appl. No.: 6,103

[22] Filed: Jan. 23, 1987

Related U.S. Application Data

[63] Continuation-in-part of Ser. No. 806,678, Dec. 9, 1985, Pat. No. 4,646,695.

[51] Int. Cl.[4] .................. F02B 19/16; F02B 19/18
[52] U.S. Cl. .................................. 123/256; 123/266; 123/268; 123/286
[58] Field of Search ............... 123/256, 263, 266, 267, 123/268, 286, 280

[56] References Cited

U.S. PATENT DOCUMENTS

| | | | |
|---|---|---|---|
| 1,422,794 | 7/1922 | Smith | 123/256 X |
| 2,100,320 | 11/1937 | Browning | 123/266 |
| 2,118,058 | 5/1938 | Riley | 123/266 X |
| 4,038,959 | 8/1977 | Takizawa et al. | |
| 4,076,000 | 2/1978 | Goto et al. | |
| 4,092,969 | 6/1978 | Ono et al. | |
| 4,144,848 | 3/1979 | Hatanaka et al. | |
| 4,160,431 | 7/1979 | Yagi et al. | 123/256 |
| 4,174,679 | 11/1979 | Noguchi et al. | |
| 4,218,993 | 8/1980 | Blackburn | 123/256 |
| 4,416,228 | 11/1983 | Benedikt et al. | 123/268 |
| 4,499,399 | 2/1985 | Flores | 123/266 X |
| 4,534,327 | 8/1985 | Latsch et al. | 123/263 |
| 4,646,695 | 3/1987 | Blackburn | 123/256 |

OTHER PUBLICATIONS

SAE Article, "Swirl-Chamber Spark Plugs Improve Combustion Process", date and author Unknown.

*Primary Examiner*—Tony M. Argenbright
*Attorney, Agent, or Firm*—Pitts and Brittian

[57] ABSTRACT

A flame ignitor for internal combustion engines. This flame ignitor is, in one embodiment, an insert unit to be received in, for example, a conventional spark plug hole of an engine. It is to project into the combustion chamber of the engine a sufficient distance, and at a selected orientation, such that an opening will collect a portion of fuel-rich fuel-air mixture from within the combustion chamber and direct the same toward a spark gap of a spark producing device located in the opposite end of the unit. The device has an elongated secondary chamber proximate the combustion chamber and a primary chamber proximate the spark gap. The opening into the secondary chamber also provides an outlet from the secondary chamber to direct ignited fuel into the engine combustion chamber above the piston head at a high rate of speed to ignite any fuel-air mixture therein prior to the initiation of combustion knock. Extended passageways within the primary chamber automatically provide the timing delays for the respective speeds of the engine.

20 Claims, 3 Drawing Figures

DEVICE FOR IMPROVING THE IGNITION OF FUEL-AIR MIXTURES IN INTERNAL COMBUSTION ENGINES

BACKGROUND OF THE INVENTION

This is a Continuation-In-Part application based upon parent case Ser. No. 806,678, filed Dec. 9, 1985, now U.S. Pat. No. 4,646,695.

TECHNICAL FIELD

This invention relates to devices for the ignition of fuel-air mixtures in internal combustion engines, and more particularly to a device to be used in combination with conventional spark plugs or with other regular or special spark producing devices whereby a portion of the enriched fuel-air mixtures within the engine cylinder is directed into the spark gap of the spark producing devices, and the resultant ignited fuel-air mixture is directed back into the engine combustion chamber at an optimum velocity to further enhance the total ignition of the mixture and thereby permit reduction of the fuel-air ratio and/or octane rating of the fuel without loss of power or incurring combustion knock.

Until recent years, internal combustion engines have employed almost unchanging principles of operation. This applies to both two-cycle engines and four-cycle engines. However, as the problems of pollution control and efficiency are addressed, there have been new approaches to the functioning of these engines. For example, the shape of the combustion chambers has been modified, fuel injection is being used, and various devices have been devised to "preignite" the fuel mixture in localized spots in order to enhance the ignition of the total fuel mixture. Most automobile manufacturers, in the United States at least, utilize computer control which includes an adjustment of timing rather than rely upon vacuum control for the timing. Even multiple spark plugs for each cylinder are utilized in certain engines. Some engines are now manufactured with three or four valves per cylinder, rather than two, to improve performance. Some late model and experimental engines use various designs of piston and cylinder heads to form varying-shaped combustion chambers such as hemispherical, wedge, "L" and others. Still other engines utilize port, slide, poppet or rotary valves. These are just a few of the variations that have been utilized to improve engine efficiency and reduce the pollution caused by these engines.

Because of the many variations in engine design, certain definitions are used hereinafter with regard to application of the present invention to those engines. For example, reference will be made to the "exhaust", "manifold" or "hotside" to indicate the region of highest temperature in the combustion chamber, and "intake" or "intake manifold" to indicate the lowest temperature region.

Many of the improvements devised for internal combustion engines have originated in Japan, particularly for use in Honda and Toyota vehicles. Typical of such devices are shown in U.S. Pat. Nos. 4,038,959; 4,076,000; 4,092,969; 4,144,848; and 4,174,679. Other devices for this purpose are shown in U.S. Pat. No. 4,416,228 (for a German development), and a paper on "Swirl-Chamber Spark Plugs Improve Combustion Process", written about developments by Bosch engineers in Germany. Another special unit for increasing the efficiency of combustion is shown and described in U.S. Pat. No. 4,534,327, assigned to Bosch.

Also, a device for these purposes is described in my U.S. Pat. No. 4,218,993. In this last reference, I describe the use of the injection of a small quantity of highly combustible fuel into the region near the spark gap to enhance the ignition of the regular fuel mixture and to produce a high-speed flame to further ignite all of the fuel mixture.

Many of the devices of the prior art require a substantial change in the structural portions of an engine and therefore are not of value in the conversion (i.e., retrofit) of a "conventional" engine. Of course, the structural changes required to accommodate these designs in a retrofit process will be determined by the specific engine design. The ignition devices of the prior art that can be used to retrofit an engine without structural change do not include elements for controlling the timing for satisfactory performance at speeds from idle to full throttle. They do little, if anything, to eliminate combustion knock or enhance overall combustion control.

The parent case of this application (Ser. No. 806,678), which is incorporated by reference, describes and claims various embodiments of a device which overcomes the above-cited problems and shortcomings of the prior art. Basically, that device is a unit to be received in a conventional spark plug hole (or a special hole) of an engine. There are two chambers within the device: a primary chamber proximate the spark-producing region of a spark plug (or other igniter) inserted therein; and a secondary chamber toward the combustion chamber within the engine. A bell-shaped inlet port between the combustion chamber and the secondary chamber is directed toward a region of "good" gas-air mixture. A separate outlet port between the secondary chamber and the combustion chamber is oriented to direct a high speed flame therefrom into the region of greatest volume within the combustion chamber. Certain embodiments are described to provide for the control of flame propagation as required for computer-controlled engines.

Although the device described in Ser. No. 806,678 has been shown to increase fuel economy, reduce emissions and improve engine performance even with low octane fuels, certain problems may exist for the mass production thereof. As stated above, there are two ports that must be oriented. The orientation is not only with regard to interior portions of the combustion chamber, but also with respect to each other. Since there are so many configurations of combustion chambers (position and orientation of spark plug hole, valves, and the shape of the chamber), a large number of units must be stocked if the device is to be widely used. Further, retrofit of an engine gives rise to a potential problem of orientation by a mechanic not fully trained regarding the device.

Accordingly, it is a principal object to provide a simple device for use in internal combustion engines, which will improve efficiency and performance, will further reduce the generation of polluting emissions, and will simplify installation in combustion engines.

Another object of this invention is to provide means whereby extra lean fuel mixtures and/or low octane fuel can be used in an engine without producing combustion knock.

It is also an object of the present invention to provide a device that can be adapted to new production-type engines without major retooling.

It is another object to provide a device for this usage that accomplishes good performance at all power levels with little or no use of a conventional spark advance.

Another object of the present invention is to provide a device with controlled flame delay which will allow it to be used in conventional engines with no timing adjustment or other alterations.

Still another object of this invention is to provide a device that will allow automobile and other manufacturers to reduce engine size while maintaining the same or greater power output, or to achieve higher output with the same size engine.

These and other objects of the present invention will become apparent upon a consideration of the drawings illustrated below and a complete description of the invention.

SUMMARY OF THE INVENTION

In accordance with the present invention, there is provided an insert unit to be received in a conventional spark plug hole (or into a special hole) of an engine and to project into the combustion chamber of the engine a sufficient distance, and at a selected orientation, such that a secondary chamber thereof will collect a fuel-rich portion of the fuel-air mixture from within the combustion chamber swirl region and direct the same toward a spark gap (in a primary chamber) of a spark producing device located in the opposite end of the device. The secondary chamber proximate the combustion chamber is connected by an aperture to the primary chamber. Ignited fuel-air mixture exits from the secondary chamber to direct the flame into the engine combustion chamber at a high velocity to ignite any fuel-air mixture therein. This secondary chamber is oriented to direct the flame into the region of greatest volume in the combustion chamber on the exhaust side above the piston head, thereby causing rapid ignition and thereby eliminate detonation or combustion knock. The device is self-regulating for all loads on the engine. The orientation problem is substantially reduced.

DETAILED DESCRIPTION OF THE INVENTION

Figure 1:
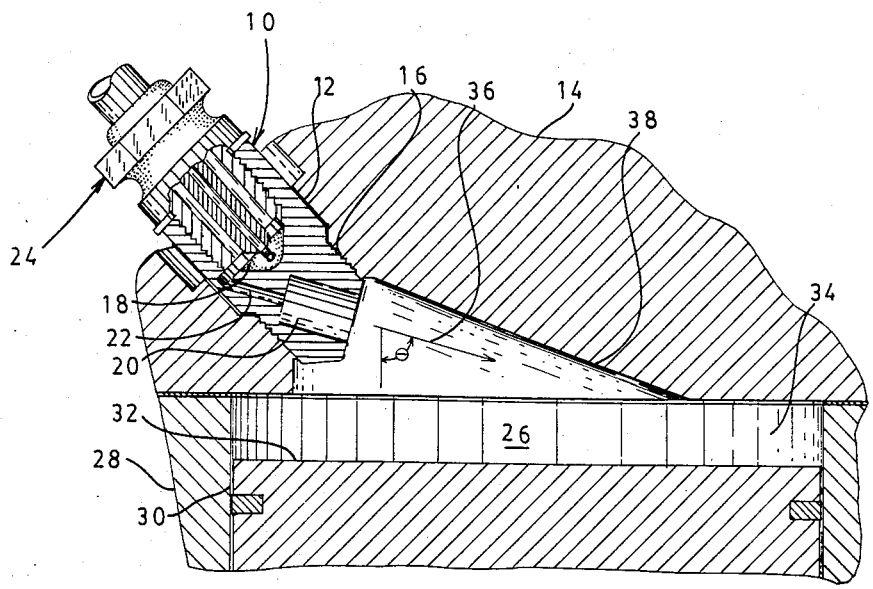
FIG. 1 is a cut-away cross-sectional drawing depicting the interior of a typical combustion chamber of an internal combustion engine illustrating an embodiment of the present invention inserted into a threaded spark plug opening or the equivalent.

Referring now to FIG. 1, shown generally at 10 is one embodiment of the flame production unit of the present invention. As illustrated, this device 10 is fitted within an aperture 12 formed in an engine head 14. The lower portion of this aperture 12 is threaded, as at 16, and the device 10 has complimentary threads to engage therewith. This aperture 12 can be a conventional spark plug hole or can be a hole specifically formed for accepting the device 10.

The device of the present invention generally has a primary ignition chamber 18 and a secondary ignition chamber 20. These are in communication as with a passageway 22. These elements are more clearly illustrated in FIG. 2. The upper end of the primary chamber 18 is threaded so as to be receptive of a conventional spark plug 24 (or other spark producing device).

In order to illustrate the orientation of the device 10 in an engine, a combustion chamber 26 of the engine is illustrated within an engine block 28. A portion of a piston 30 is illustrated, with the piston face designated at 32. For illustrative purposes, gas movement within the combustion chamber 26 is assumed to produce a swirl region (at 34) of particularly enriched fuel-air mixture. It is toward this region 34 that an axis 36 of the secondary chamber 20 is directed. The cylinder head 14 is provided with a recess 38 to accommodate the device 10 above the piston face 32. This recess is generally provided in all engines. Engines from different manufactures have varying configurations of the aforementioned recess 38 as well as the orientation of the spark plug hole. Thus, for any given engine (combustion chamber design) an optimum angle, $\theta$, must be chosen between the axis 36 of the secondary chamber 20 and the face 32 of the piston. Generally, this angle $\theta$, will vary between about 30 to 60 degrees, although other angles can be used to appropriately direct the flame toward the most effective portion of the upper region of the combustion chamber 26.

Figures 2, 3:
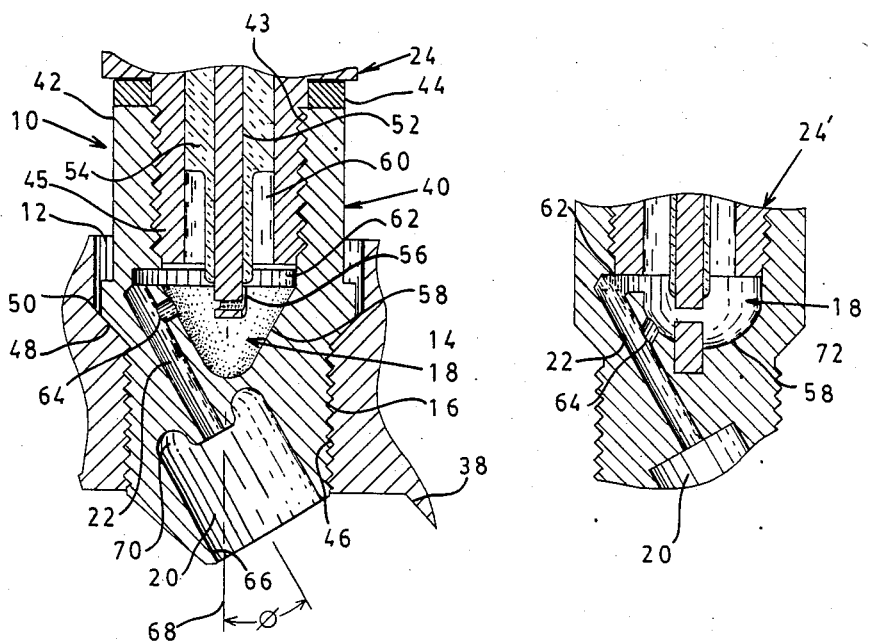
FIG. 2 is a cross-sectional view of one embodiment (the embodiment of FIG. 1) of the present invention as enlarged to better understand the components thereof.
FIG. 3 is a cross-sectional view of another embodiment of the present invention as enlarged to better understand the components thereof.

More detail of the flame-producing device 10 is given in the enlarged view in FIG. 2. It is formed from a substantially cylindrical body 40 having an upper portion 42 bored at 43 and tapped to receive the spark plug 24. A typical metal gasket 44 is used in this embodiment for the spark plug seal. A lower portion of the body 40 is threaded as at 46 to threadably engage the threads 16 in the cylinder head 14. At an intermediate portion the body 40 is provided with a sloped face 48 to seal against a corresponding seat 50 in the head. A conventional spark plug 24 is illustrated in this FIG. 2 (as in FIG. 1). This has a central electrode 52 surrounded by a sleeve of insulator 54, and a curved ground electrode 56.

The primary ignition chamber 18 in this embodiment is made up of three components. The body 40 is provided with a generally concave recess 58 and it is within this recess that the spark plug electrodes 52, 56 are positioned. In order that a delay in propagation of the flame is produced, the volume 60 surrounding the spark plug insulator 54 is a portion of the primary chamber 18. The third component is a substantially disk-shaped volume 62 having a center of rotation off-set from the axis of the spark plug. These components, in combination, provide adequate volumes and delay paths to automatically provide the timing for a particular speed of the engine.

Intersecting the disk-shaped volume 62, at a position most removed from the axis of the spark plug, is the cylindrical passageway 22 joining the primary chamber 18 to the secondary chamber 20. It is this passageway 22 that conveys enriched fuel-air mixture from the combustion chamber of the engine into the primary chamber during a compression stroke of the piston 30. The passageway 22 also directs the rapid flame of ignited fuel-air mixture from the primary chamber (after delay in the portions of the primary ignition chamber) into the combustion chamber to ignite the fuel-air mixture therein for the power stroke of the piston. Further, there preferably is a small by-pass aperture 64 provided that joins the recess 58 with the passageway 22 whereby a small flame bypasses the delay regions to begin the flame ignition propagation toward the secondary chamber. In some engines this by-pass aperture is not required. This by-pass is similar in function to the chamber 206 and passageway 208 of FIG. 15A described in the aforementioned application Ser. No. 806,678. All of the primary chamber, in fact, performs in a similar manner to the embodiments of the primary chambers shown in FIGS. 10A and 15A of that application.

The secondary chamber 20 of the present invention, although providing a similar function as that of Ser. No. 806,678 is structured in a substantially different manner. The principal difference is the elimination of any barrier between the secondary chamber 20 and the combustion chamber 26 (compare with FIG. 2 or FIG. 11 of Ser. No. 806,678). Thus, the opening or throat 66 serves as both inlet and outlet port. Accordingly, the only orientation that must be considered in fabricating the device is the angle $\phi$ between the axis 68 of the body 40 and the axis 36 of the secondary chamber 20. During installation, an exterior mark can be used to orient the axis 36 of the secondary chamber properly. Although not shown, a spacing adjustment ring can be used as discussed in Ser. No. 806,678 to obtain a proper seal at the desired orientation.

The secondary chamber 20 in this embodiment (FIG. 2) differs from that illustrated in FIG. 1 by the enclusion of a "trapping" volume 70. This holds a portion of fuel-air mixture that then burns behind the main flame to add exit velocity from the secondary chamber. This region 70 is similar to a corresponding region in Ser. No. 806,678 (see FIGS. 2, 11, and 15A thereof).

FIG. 3 illustrates the improved high-speed flame producing device 10' as modified to accommodate a spark plug 24' having only a central electrode 52. The ground electrode is provided by a stud 72 mounted within the base of the recess 58'. Furthermore, in this embodiment the volume 62', rather than being a disk-shaped volume having a center of rotation off-set from the center line of the spark plug, is actually an extension of the bore 43 below the skirt 45 of the spark plug 24. This significantly simplifies manufacture. In all other respects, the device is as shown in FIGS. 1 or 2.

Although not given to limit the invention, some typical dimensions of the present invention are as follow. These dimensions (particularly those for the secondary chamber) will change to some degree for different engines. The disk-shaped volume 62 is typically $1/16 \times 0.506$ inch, and the passageway 22 is typically 0.096 inch I.D. The by-pass aperture is typically 0.070 inch I.D. The secondary chamber typically has a diameter of 0.406 inch I.D., and a depth of about 0.350 inch. The angle $\theta$ is typically about 30 degrees. The volume of the primary chamber typically is 0.043 cubic inch, and that of the secondary chamber is typically 0.034 cubic inch.

A 1978 Ford Fairmont having a 200 CID engine (compression ratio 8.5:1) was equipped with units of the present invention having the above-cited typical dimensions. The vehicle was tested for exhaust emissions, power and knock performance. It was operated with both conventional gasoline and gasoline to which kerosene was added to reduce the octane. More specifically, the engine was operated with 87 octane gasoline and gasoline (87 octane)-kerosene mixtures. These mixtures contained 20–30 wt % kerosene giving octane ratings of about 77 down to 71. The vehicle did not exhibit adverse knock problems even under heavy load. Exhaust emissions were low: 1–1.1% CO and 120–160 ppm hydrocarbons. Fuel economy with a 22.5 wt % kerosene was increased about 8.4% over that achieved with normal spark plugs.

Although the present device has been described as a unit to thread into a tapped hole of the engine head, it can be fabricated integrally in the engine head. Alternatively, it can be formed separately and then press fit and/or welded into an aperture in the head. Also, the spark plug portions can be formed as a non-separable portion of the invention.

From the foregoing, it will be recognized by those skilled in the art that an improved flame ignition device for internal combustion engines has been shown and fully described. These devices are more easily manufactured and installed than those of Ser. No. 806,678. Numerous embodiments of the units have been described; however, these are not provided to limit the scope of the invention but to give illustrations of the value of the present invention. Accordingly, the scope of the invention is only to be limited by the claims appended hereto and their equivalents.

I claim:

1. A flame ignitor for internal combustion engines for achieving self-regulation of ignition timing, improved fuel economy, and substantial elimination of combustion knock, which comprises:

a body member extending from exterior of such engine to a cylindrical combustion chamber of such engine, said body member being provided with a bore having a first end proximate an outer surface of such engine and a second end proximate an ignition region of said combustion chamber, said first end of said bore adapted to receive a spark producing device, said second end of said bore having an axis aligned at a selected angle, $\theta$, to an axis of said combustion chamber;

a barrier wall positioned within said bore dividing said bore into a primary ignition chamber proximate said first end for surrounding said spark producing device and a secondary ignition chamber proximate said second end, said barrier wall being provided with a channel providing communication between said primary ignition chamber and said secondary ignition chamber, said primary chamber being provided with extended passageways for retarding a flame front exiting said primary chamber and thus regulating the velocity of a flame exiting said secondary ignition chamber as a function of pressure within said primary ignition chamber for achieving timing delay according to engine speed to substantially prevent combustion knock and improve fuel economy; and wherein said angle, $\theta$, is selected for directing said axis of said second end of said bore toward a region of fuel-rich mixture within said combustion chamber above a piston head within said combustion chamber.

2. The flame ignition device of claim 1 wherein said angle, $\theta$, is between about 30 degrees and 60 degrees.

3. The flame ignition device of claim 1 further comprising an extended volume within said secondary chamber proximate said barrier for holding a portion of any combustible fuel mixture whereby said held portion is ignited behind a flame front exiting said channel to thereby increase velocity of said flame front exiting said secondary ignition chamber.

4. The flame ignition device of claim 1 wherein said first end of said bore is threaded to accept a spark plug having a central high potential electrode to be positioned within said primary ignition chamber.

5. The flame ignition device of claim 1 wherein said body member is a head of such engine having a plurality of combustion chambers, said head being provided with at least one of said bores for each of said combustion chambers.

6. The flame ignition device of claim 1 wherein such engine includes a head provided with an opening leading to each combustion chamber of such engine, and said body member comprises a shell inserted into said openings.

7. A flame ignition unit for insertion in openings leading to each combustion chamber of an internal combustion engine for achieving self-regulation of ignition timing, improved fuel economy and substantial elimination of combustion knock, which comprises:

a body member having a first end to extend through such opening into such combustion chamber, and a second end, said body member being provided with an internal primary ignition chamber proximate said second end, and a secondary ignition chamber proximate said first end separated from said first ignition chamber by a barrier wall, said barrier wall provided with a channel providing communication between said primary ignition chamber and said secondary ignition chamber;

said first end of said body being provided with a singular inlet-outlet port communicating with said secondary ignition chamber, said inlet-outlet port for orientation toward a region of fuel-rich mixture in such combustion chamber;

a spark producing means positioned within said primary ignition chamber;

mounting means for mounting said body member in such engine, said mounting means providing for sealing said body against leaks from such combustion chamber and for providing selected rotation of said body member for optimum alignment of said inlet-outlet port with said fuel-rich region; and wherein said secondary chamber is provided with a portion of extended volume proximate said barrier for holding a portion of any combustable mixture entering such unit for regulating the velocity of a flame exiting said inlet-outlet port as a function of pressure within said primary ignition chamber wherein ignition within such unit provides a flame exiting said secondary ignition chamber of sufficient velocity to substantially prevent combustion knock.

8. The flame ignition unit of claim 7 wherein said secondary ignition chamber is substantially cylindrical having a central axis, with said extended volume being a portion of increased length surrounding said channel.

9. The flame ignition unit of claim 8 wherein said channel has an axis substantially aligned with said axis of said secondary ignition chamber.

10. The flame ignition unit of claim 7 wherein such opening is threaded throughout its length and is provided with an annular shoulder on the exterior of such engine, and said mounting means comprises threads provided on a portion of the exterior of said body member toward said first end for threadable engagement with threads of such opening.

11. The flame ignition unit of claim 7 wherein said spark producing means comprises a high tension electrode, an insulator substantially surrounding said high tension electrode, and a ground electrode.

12. The flame ignition unit of claim 11 wherein said ground electrode is attached to a wall of said primary ignition chamber.

13. The flame ignition unit of claim 7 wherein said primary ignition chamber comprises a plurality of interconnected volumes between said spark producing means and said channel for retarding flame propagation at high pressures within said primary ignition chamber, said high pressures associated with high power operation of such engine, without significantly retarding said flame propagation at relatively lower pressure within said primary ignition chamber, said lower pressure associated with idle operation of such engine.

14. The flame ignition unit of claim 13 wherein said plurality of interconnecting volumes comprises:

a substantially cup-shaped surface defining a first chamber portion to receive high tension and ground electrodes of said spark producing means;

a substantially disk-shaped surface defining a second chamber portion interconnected between said first chamber portion and said channel; and a third chamber portion surrounding said high tension electrode and communicating with said second chamber portion.

15. The flame ignition unit of claim 14 wherein said disk-shaped second chamber portion has a center of revolution offset from an axis of said spark producing means.

16. The flame ignition unit of claim 14 wherein said interconnecting volumes of said primary ignition chamber further comprises a by-pass aperture communicating between said first chamber portion and an intermediate position along said channel.

17. A flame ignition unit for insertion in threaded openings leading to each cylindrical combustion chamber of an internal combustion engine, such opening having a radial shoulder, for achieving self-regulation of ignition timing over a wide range of engine load conditions from idle to full power, such flame ignition unit substantially eliminating combustion knock while achieving improved fuel economy and reduced emissions, which comprises:

a substantially cylindrical body member having a first end portion to extend through such opening into such combustion chamber, and a second end portion, said body member being provided with an internal substantially cup-shaped primary ignition chamber within said second end portion, and with a substantially cylindrical secondary ignition chamber, having an axis and a circular cross-section, within said first end of said body member separated from said primary ignition chamber ignition chamber by a barrier wall, said barrier wall provided with a channel providing communication between said primary ignition chamber and said secondary ignition chamber, said secondary ignition chamber being provided with a portion of increased length proximate said barrier wall for holding a portion of any combustable mixture entering such unit for regulating the velocity of a flame exiting said secondary ignition chamber as a function of pressure within said primary ignition chamber wherein ignition within such unit provides a flame exiting said secondary ignition chamber of sufficient velocity to substantially prevent combustion knock;

said first end of said body member being provided with a single inlet-outlet port communicating with said secondary ignition chamber, said inlet-outlet port for orientation toward a region of fuel-rich mixture in such combustion chamber whereby said fuel-rich mixture entering through said inlet-outlet port is caused to be directed forward said channel in said barrier and into said primary ignition chamber;

a spark producing means positioned within said primary ignition chamber, said spark producing means comprising a central high tension electrode, an insulator surrounding said high tension electrode and a ground electrode whereby a spark can be produced between said high tension electrode and said ground electrode; and mounting means for sealingly positioning said body member in such opening and selectively orienting said inlet-outlet port toward said fuel-rich region, said mounting means comprising threads on the external surface of said first end of said body member for threadable engagement with such threads of such opening.

18. The flame ignition device of claim 17 wherein said inlet-outlet port is of a size substantially that of said circular cross-section of said secondary ignition chamber.

19. The flame ignition device of claim 17 wherein said axis of said secondary ignition chamber is oriented at a selected angle, $\theta$, with respect to an axis of said combustion chamber so as to orient said inlet-outlet port to said fuel-rich mixture in said combustion chamber.

20. The flame ignition device of claim 19 wherein said angle, $\theta$, is selected between about 30 degrees and about 60 degrees.

* * * * *